United States Patent [19]

Enomoto et al.

[11] 3,963,910

[45] June 15, 1976

[54] AUTOMATIC TAX CALCULATING APPARATUS

[76] Inventors: Akio Enomoto, 237-3, Ohhito, Ohhitocho; Yuji Tadakuma, 80-Z, Mifuku, Ohhitocho, both of Tagata, Shizuoka, Japan

[22] Filed: Aug. 5, 1974

[21] Appl. No.: 494,879

[30] Foreign Application Priority Data

Aug. 10, 1973  Japan................................. 48-89715
Aug. 10, 1973  Japan................................. 48-89716
Aug. 10, 1973  Japan................................. 48-89717

[52] U.S. Cl.............................. 235/156; 235/168
[51] Int. Cl.²........................................... G06F 7/38
[58] Field of Search .......... 235/156, 159, 160, 164, 235/168

[56] References Cited
UNITED STATES PATENTS

| | | | |
|---|---|---|---|
| 3,253,132 | 5/1966 | Pendleton............................ | 235/168 |
| 3,294,960 | 12/1966 | Townsend............................ | 235/160 |
| 3,598,973 | 8/1971 | Brooks et al........................ | 235/168 |
| 3,710,085 | 1/1973 | Brewer et al. ...................... | 235/164 |

*Primary Examiner*—David H. Malzahn
*Attorney, Agent, or Firm*—Oblon, Fisher, Spivak, McClelland & Maier

[57] ABSTRACT

An automatic tax calculating apparatus comprising a tax amount data memorizing unit for memorizing tax amounts of an unproportional portion $a$ and tax amounts of a proportional portion $b$ of the lowest range, a WT memorizing unit for memorizing a proportional portion repeated money amount W and a step number T of said proportional portion $b$, a register for memorizing a taxable money amount $\alpha$, a register for memorizing a maximum money amount A of an unproportional portion, a register for storing a repeated number N of the proportional portion repeated money amount W by storing the result of a calculation of $\alpha-A$, a register for memorizing a product E of said repeated number N and said step number T, and a calculating unit for calculating said product and for retrieving from said tax amount data memorizing unit a money amount obtained by subtracting a product of said proportional portion repeated money amount W and said repeated number N from said taxable money amount $\alpha$ and for calculating a required tax amount by adding said tax amount and a product E of said repeated number N and said step number T.

4 Claims, 9 Drawing Figures

| Taxable money amount | | Tax | Remarks | |
|---|---|---|---|---|
| from | to | | | |
| $  ¢ | $  ¢ | ¢ | | |
| 1 | 12 | 0 | | |
| 13 | 34 | 1 | Unproportional portion | a |
| 35 | 59 | 2 | | |
| 60 | 87 | 3 | | |
| 88 | 1 12 | 4 | | b |
| 1 13 | 1 37 | 5 | | |
| 1 38 | 1 62 | 6 | Proportional portion 4% | |
| 1 63 | 1 87 | 7 | | |
| 1 88 | 2 12 | 8 | Disregarding fraction below 4 | |
| 2 13 | 2 37 | 9 | | |
| 2 38 | 2 62 | 10 | | |

AUTOMATIC TAX CALCULATING APPARATUS

This invention relates to a register apparatus and, more particularly, to an automatic tax calculating apparatus for use in a cash register which is adapted to calculate tax amounts such as for commodity tax which is not susceptible to simple calculation.

For instance, referring to a setting of a commodity tax in Arizona in the United States, tax amounts are unproportionally set in a predetermined range of low prices and are proportionally increased when they exceed a predetermined range. For this reason, retail shops are furnished with tax amount tables and they determine tax amounts by reading those tax amount tables. Thus, a sales price is determined by adding the tax to the labelled price. However, a mistaken read-out often occurs and, furthermore, the calculation of tax amount cannot be simply made. Therefore, when a cashier calculates a sales amount, the calculation is both difficult and time consuming.

A primary object of this invention, therefore, is to automatically calculate a tax amount corresponding to a sales price based on determined tax amounts by a cash register.

A second object of this invention is to facilitate a tax amount setting of a tax amount data memorizing unit incorporated in a cash register.

A third object of this invention is to simplify the construction of block connectors constituting a tax amount data memorizing unit.

These and other objects and advantages of the present invention will now be more clearly understood in the following description taken in conjunction with the accompanying drawings in which.

Figures 1, 2:
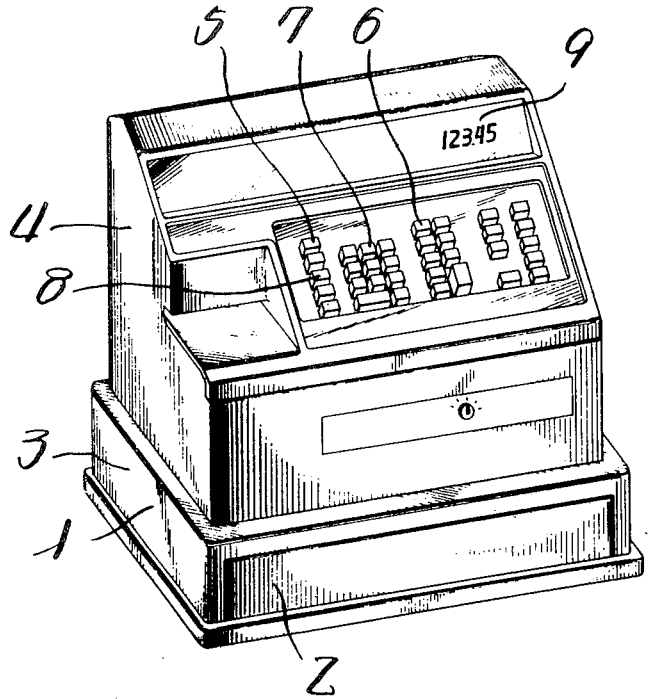
FIG. 1 is a perspective view of a cash register.
FIG. 2 is a tax amount table of a commodity tax adopted in Arizona in the United States.

One of the preferred embodiments of the present invention will now be described in conjunction with the drawings. A cash register comprises a base frame 3 having a drawer 2 able to be pulled forward and a main body 4 in which are arranged operation keys including tax selection key 5, tax total key 6 and amount key 7, and an indicating unit 9 is provided in its upper portion. And, an electronic circuit as described later is incorporated in said main body 4.

Figures 3, 4:
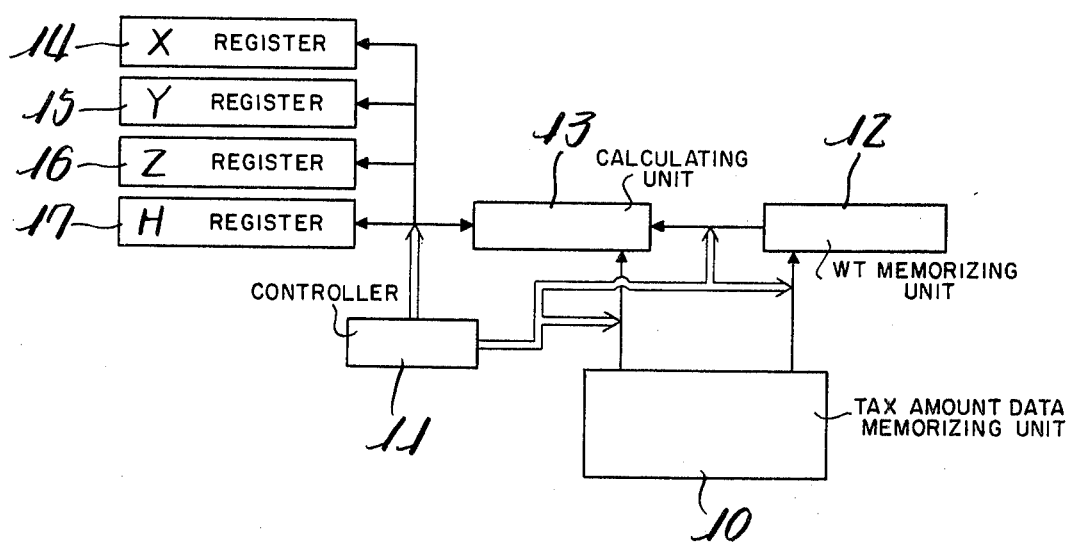
FIG. 3 is an explanatory view illustrating the contents being memorized in a tax amount data memorizing unit.
FIG. 4 is a block diagram of an electric circuit illustrating the components of the invention and their interconnections.

First of all, when the commodity taxes adopted in Arizona in the United States are examined based on FIGS. 2 and 3, it is understood that the aforementioned taxes are determined based on such a rule as described below. In other words, a range from 1¢ to 87¢ is divided into four stages and said range is regarded as an unproportional portion $a$ which is not common with other portions. And, the maximum money amount of the unproportional portion $a$ is 87¢. Then, the range from 88¢ to $1.87 is divided into four stages. Similarly, the ranges from $1.88 to $2.87, $2.88 to $3.87 and so on are regarded as a proportional portion $b$ in which tax amounts are increased proportionally in sequence. A proportional portion repeated money amount W of said proportional portion $b$ is $1.00, its step number T is 4¢, and a tax amount is of a constant rate of 4% and is determined by counting a fraction over ½ as one and disregarding the rest below a decimal point. And, a maximum money amount B of the proportional portion of the lowest range is $1.87.

The construction and operation will now be described in conjunction with FIG. 4. Memorized into the tax amount data memorizing unit 10 are maximum numerical values of each stage of the unproportional portion $a$ and their corresponding tax amounts, maximum numerical values of each stage of the lowest range of the proportional portion $b$ and their corresponding tax amounts, and the maximum tax amounts of the unproportional portion $a$ and the lowest range of the proportional portion $b$. The above-mentioned tax amount data memorizing unit 10 is connected to a controller 11 and at the same time connected to WT memorizing unit 12 and a calculating unit 13. In the WT memorizing unit, the proportional portion repeated money amount W and the step number T of the proportional portion $b$ are memorized. Registers X 14, Y 15, Z 16, and H 17 are connected to the controller 11 and calculating unit 13, respectively. A taxable money amount $\alpha$ is set into X register 14, the maximum money amount A of the unproportional portion is set into Y register 15 from the tax amount data memorizing unit 10, and a calculation of $\alpha - A = C$ is made using both of these numerical values. As a result, C is memorized into the register X 14. At this time, the taxable amount $\alpha$ is transferred to the register H 17. And, a calculation of:

$$C - W \times N \less O$$

is made. In other words, the proportional portion repeated money amount W is read out from the WT memorizing unit 12 and the number of times when the proportional portion repeated money amount W is subtracted from the contents of X register, namely, N is counted by register Y 15. When the numerical value becomes less than zero, one addition of proportional portion repeated money amount W is made and the subtracted number of times are memorized in the register Y 15 as the number of times N. Then, the step number T is read out from WT memorizing unit 12 and said step number T is multiplied by the repeated number of times N of register Y, producing a product E which is, then, memorized in register Z 16. A fraction F is calculated by substracting a product of the proportional portion repeated money amount W and the repeated number N from a taxable amount $\alpha$ memorized in register H 17, and a required tax amount K is calculated by adding a tax amount G corresponding to said fraction F taken from tax amount data memorizing unit 10 and a tax amount E memorized in register E 16.

The aforementioned process of calculation will be summarized as follows:

1. $\alpha - A = C$
2. $C - W \times N \less O$ ... N is obtained
3. $N \times T = E$ 4. $\alpha - W \times N = F$
5. $F \rightarrow G$
6. $E + G = K$ An example of a calculation will now be described assuming the taxable amount as $4.80. The tax amount K for $4.80 should be 19 ¢, and the calculating process of the aforementioned items 1 – 6 is as follows:

1. $4.80 − 87¢ = $3.93
2. $3.93 − $1.00 × N ≮ 0  N = 3
3. 3 × 4¢ = 12¢
4. $4.80 − $1.00 × 3 = $1.80
5. $1.80 → 7¢
6. 12¢ + 7¢ = 19¢

In the aforementioned embodiment, the status where four registers 14, 15, 16 and 17 are employed was described, but in the actual exercises four registers are not necessarily required, and can be reduced depending upon the capacity of the calculating unit 13.

Figure 5:
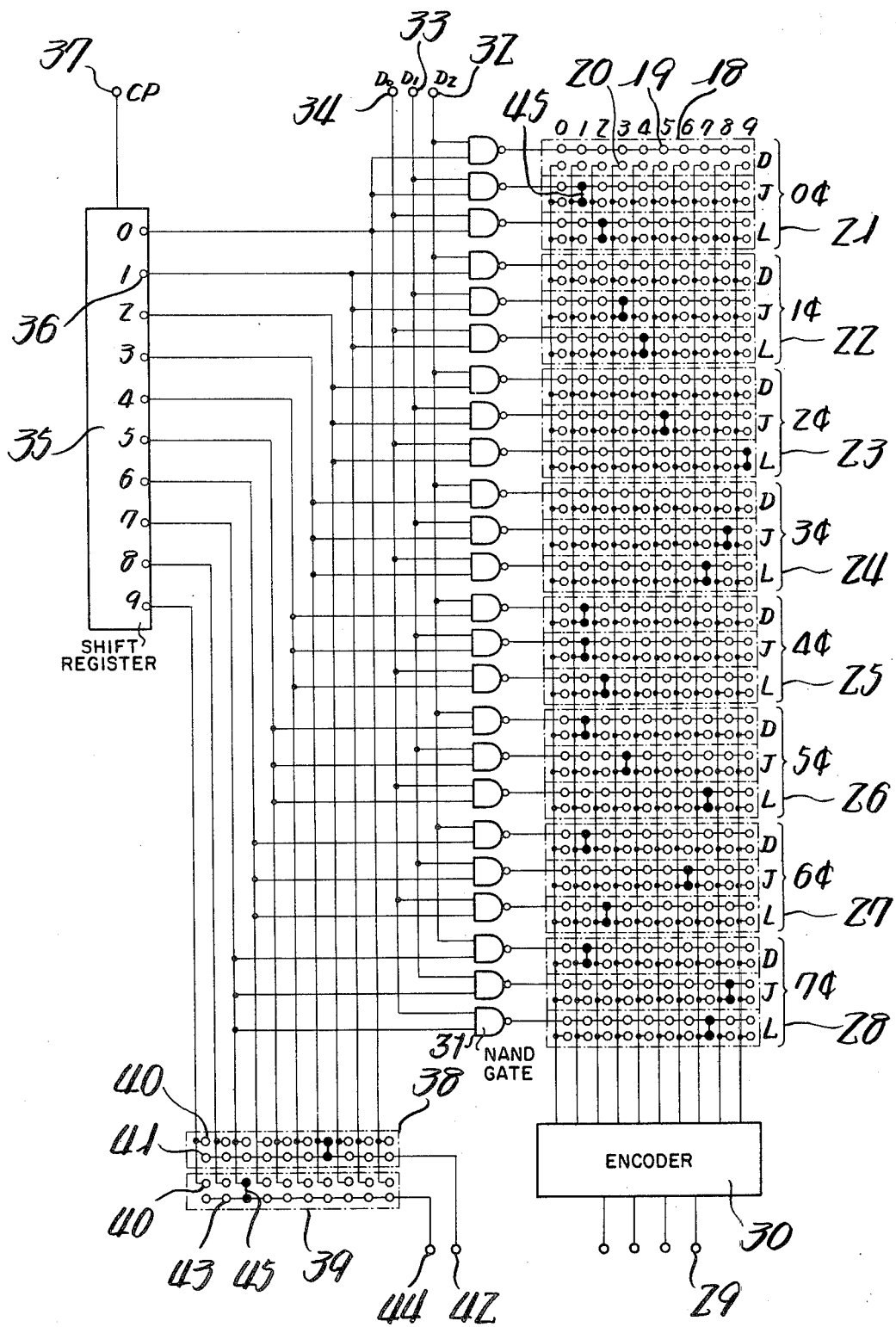
FIG. 5 is a circuit diagram of a tax amount data memorizing unit.

Next, the tax amount data memorizing unit in FIG. 5 will now be described.

Numeral 18 designates a connector block. Ten input terminals 19 short-circuited to each other corresponding to the numerical values of 0–9 and 10 output terminals 20 corresponding to said input terminals 19 are provided in said connector block 18. Said connector block 18 comprises three connectors D, J and L for $, 10 ¢ and ¢, respectively, and said connector block 18 consists of blocks 21, 22, 23 and 24 for four groups of 0¢ −3¢ in the unproportional portion a and blocks 25, 26, 27 and 28 for four groups of 4¢ −7¢ of the proportional portion b. Output terminals 20 corresponding to 0–9 of said blocks 21–28 are commonly-connected and are connected to an encoder 30 having four output terminals 29.

Furthermore, NAND gates 31 are connected to input terminals 19 of said connector block 18, and $D_2$ terminal 32 for $, $D_1$ terminal 33 for 10¢ and $D_0$ terminal 34 for ¢ are connected to the input sides of NAND gates 31 corresponding to block connectors 18 of D, J and L. The 0–7 portions among terminals 36 including 0–9 of a shift register 35 are connected to each three NAND gates 31 corresponding to each block 21–28. Said shift register 35 is advanced by clock pulses CP from a terminal 37.

Moreover, a connector block 38 for the unproportional portion a and a connector block 39 for the proportional portion b are provided. Input terminals 40 of those connector blocks 38, 39 corresponding to 0–9 are connected to 0–9 terminals of said shift register 35, and furthermore output side terminal 41 of said connector block 38 is connected to an output terminal 42. Output side terminal 43 of said connector block 39 is connected to output terminal 44. Numeral 45 designates connector pins.

In the aforementioned construction, connector pins 45 are connected in the connector block 18 of each block 21–28 so as to realize the status of the side where a higher money amount in each stage shown in FIG. 2 exists. In the block 21, a tax amount is 0, and connector pins 45 are connected to 1 of connector J and 2 of connector L, thereby setting 12 ¢. Block 22 is set at 34 ¢, block 23 59¢, block 24 87¢, block 25 $1.12, block 26 at $1.37, block 27 at $1.62, and block 28 is set at $1.87. Furthermore, connector block 38 is set at 3 since the maximum tax amount A of the unproportional portion a is 3¢, and block connector 37 is set at 7 since the tax B of the constant rate portion b is 7 ¢.

0–9 of terminals 36 are scanned and an H level signal appears in sequence every time a clock pulse Cp enters the shift register 35 from the terminal 37. When 3 of terminals 36 assumes the H level, a signal appears at the output terminal 42. When 7 of terminals 36 assumes the H level, a signal appears at the output terminal 44. In the process where 0–9 of terminals 36 assumes the H level in sequence, for instance, when 0 of terminals 36 is at the H level, terminals $D_2$ 32, $D_1$ 33 and $D_0$ 34 become H level with a predetermined timing.

Thus, the output of NAND gate 31 assumes the L level, a signal is sent to encoder 30, a signal of 12 ¢ converted into BCD code is sent to output terminal 29, and sent to calculating unit 13. When 1 of terminals 36 assumes the H level, a signal of 34¢ is transmitted from output terminal 29. In this manner, signals of 59¢, 87¢, $1.12, $1.37, $1.62 and $1.87 are repeatedly transmitted. In this manner, the determined tax amounts described in FIG. 2 are given as outputs. Furthermore, when timing is taken with a shift register 35, for instance, in the case where 59¢ is transmitted, a tax amount is 2 ¢. When a signal of $1.62 is transmitted, a signal indicating that the tax amount is 6¢ can be easily obtained. In addition, since signals of 3¢ and 7¢ are transmitted from output terminals 42 and 44, respectively, when the difference of signals 3¢ and 7¢ is obtained, a step number T can be set. In the aforementioned calculating manner, all the data to be set in advance are set.

When a change of tax amount is required, a tax amount setting can be extremely easily made by changing the positions of connector pins 45.

Figure 6:
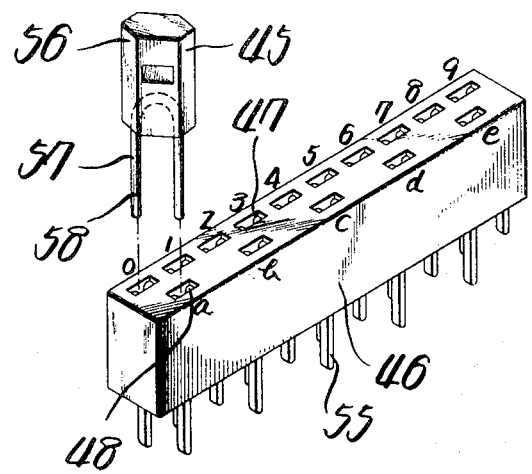
FIG. 6 is a perspective view of a block connector.
Figure 7:
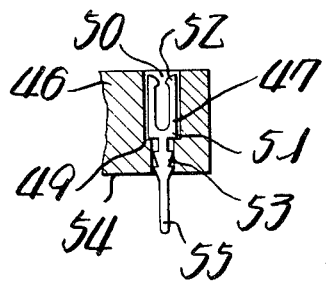
FIG. 7 is a longitudinal sectional view of a part of a block connector.

Next, the details of said connector blocks 18, 38, and 39 will be described in conjunction with FIGS. 6 and 7. 46 is a rectangular-parallelepiped-like main body made of insulating materials such as phenol resin. On said main body 46, ten terminals 47 of 0–9 are arranged in a straight line and at equal intervals, and five common terminals 48 are provided corresponding to 0 and 1, 2 and 3, 4 and 5, ... which are formed against said terminals 47 and at an equal distance therefrom. In other words, rectangular through-holes 50 having steps 49 are formed in said main body 46, and said terminals 47 and common terminals 48 are mounted in said through-holes. Said terminals 47 and common terminals 48 are of the same shape and are pressed out from plate materials and have shoulder portions 51 abutting against said step portions 49. Each of them comprises a connecting portion 52 elastically formed in a U-shape, engaging projecting pieces 53 being engaged with the side portions of said through-holes 50 for prevention of slipping-off, and a connecting leg 55 projecting downwardly from the bottom 54 of the main body 46.

45 is a connector pin and said connector pin 45 comprises a holding portion 56 made of insulating material and a pin 57 bent in a U-shape. The distance between 2 feet 58 of said pin 57 is equal to the distance between any of said terminals 47 and said common terminal 48 corresponding thereto.

In the aforementioned construction, a common wire is connected to each connecting pin 55 of 5 pieces of common terminals 48. An independent wiring is made to connecting pins 55 of 10 pieces terminals 47, respectively. When a setting of numerical value 1 is required, a of common terminals 48 and 1 to terminals 47 are connected by a connecting pin 45. Thus, when a signal enters the common terminals 48, an output is generated from 1 of terminals 47 among 10 terminals 47.

Therefore, it can be said that the numerical value of 1 is memorized. As a result, although not shown in the figure, if a plurality of main bodies 46 are disposed in parallel on the board, an appropriate connection by connector pin 45 is made on each main body 46, and a signal is given to each common terminal 48 in sequence. A signal corresponding to a set value can be obtained in sequence from a present terminal 47.

Figure 8:
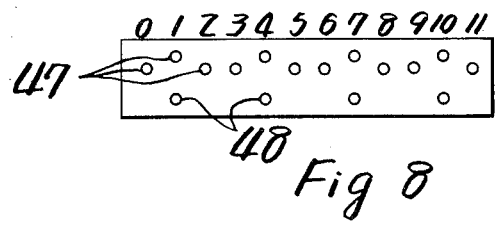
FIG. 8 is a plan view illustrating another embodiment of a block connector.

In said embodiment, a main body for decimal coding was described. As shown in FIG. 8, three terminals 47 may be grouped as one block and one common terminal 48 for these blocks may be provided. In the state shown in the figure, four common terminals 48 is adequate for obtaining 12 outputs. Therefore, a number of common terminals 48 for $n$ pieces of terminals 47 is $n/N$ pieces (where N is an integral number). In this case, the quotient of $n/N$ is not necessarily an integer, but a total of an integral value of said quotient and 1 may be used.

Figure 9:
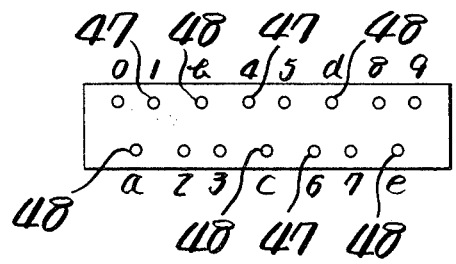
FIG. 9 is a plan view illustrating still another embodiment of a block connector.

Furthermore, as shown in FIG. 9, when two terminals 47 and one common terminal 48 are grouped as one set and these sets are alternately disposed, a main body 46 can be formed extremely compactly without shortening the spaces between each terminal, and when many main bodies 46 are disposed, space can be extremely minimized, if adequate attention is devoted to the connecting operation.

What is claimed is:

1. An automatic tax calculating apparatus for automatically calculating a tax amount for a taxable amount in a tax system having an unproportional portion for taxable amounts up to a predetermined value where tax amounts are unproportionally set and a proportional portion for taxable amounts greater than the predetermined value where tax amounts are proportionally and repeatedly set comprising:

a tax amount data memorizing unit,
   a WT memorizing unit,
   a calculating unit,
   a first register,
   a second register,
   the tax amount data memorizing unit having stored therein the maximum taxable amounts of each stage of the unproportional portion and the corresponding tax amounts and the maximum taxable amounts of each stage of the lowest range of the proportional portion and the corresponding tax amounts,
   the WT memorizing unit having stored therein the proportional portion repeated amount W and the step number T, the step number T being equal to the tax amount of a taxable amount equal to W,
   the first register having stored therein a taxable amount $\alpha$,
   the second register having stored therein the maximum taxable amount A of the unproportional portion,
   the calculating unit being connected to the first and second registers, to the tax amount data memorizing unit and the WT memorizing unit to perform the calculation $\alpha - A = C$, to calculate N by determining the number of times W can be subtracted from C, to perform the calculation $NT = E$, to perform the calculation $\alpha - WN = F$ and to retrieve from the tax amount data memorizing unit the tax amount G for the taxable amount F, and to determine the tax amount K for the taxable amount $\alpha$ by performing the calculation $E + G = K$.

2. An automatic tax calculating apparatus as set forth in claim 1 wherein the tax amount memorizing unit comprises a plurality of connector blocks for setting numerical values corresponding to each stage of the unproportional and proportional portions by insertion and removal of connector pins, a shift register for scanning the connector blocks in sequence, and an encoder connected to the output side of the connector blocks.

3. An automatic tax calculating apparatus as set forth in claim 2 wherein the connector blocks comprise a connector block connected to the shift register and adapted to set a tax amount corresponding to a maximum taxable amount of the unproportional protion by the connector pins and a connector block adapted to set a tax amount corresponding to a maximum taxable amount of the lowest range of the proportional portion and wherein an output for the step number T is obtained by the difference of outputs of the connector blocks.

4. An automatic tax calculating apparatus as set forth in claim 2 wherein the connector block comprises a main body of insulating material, $n$ pieces of terminals disposed on the main body, and $n/I$ (I being equal to an integral number) pieces of common terminals disposed at an equal distance from at least two terminals and selectively connected by connector pins.

* * * * *